(No Model.)
C. H. PERKINS.
HORSESHOE BLANK BAR.
No. 470,352. Patented Mar. 8, 1892.
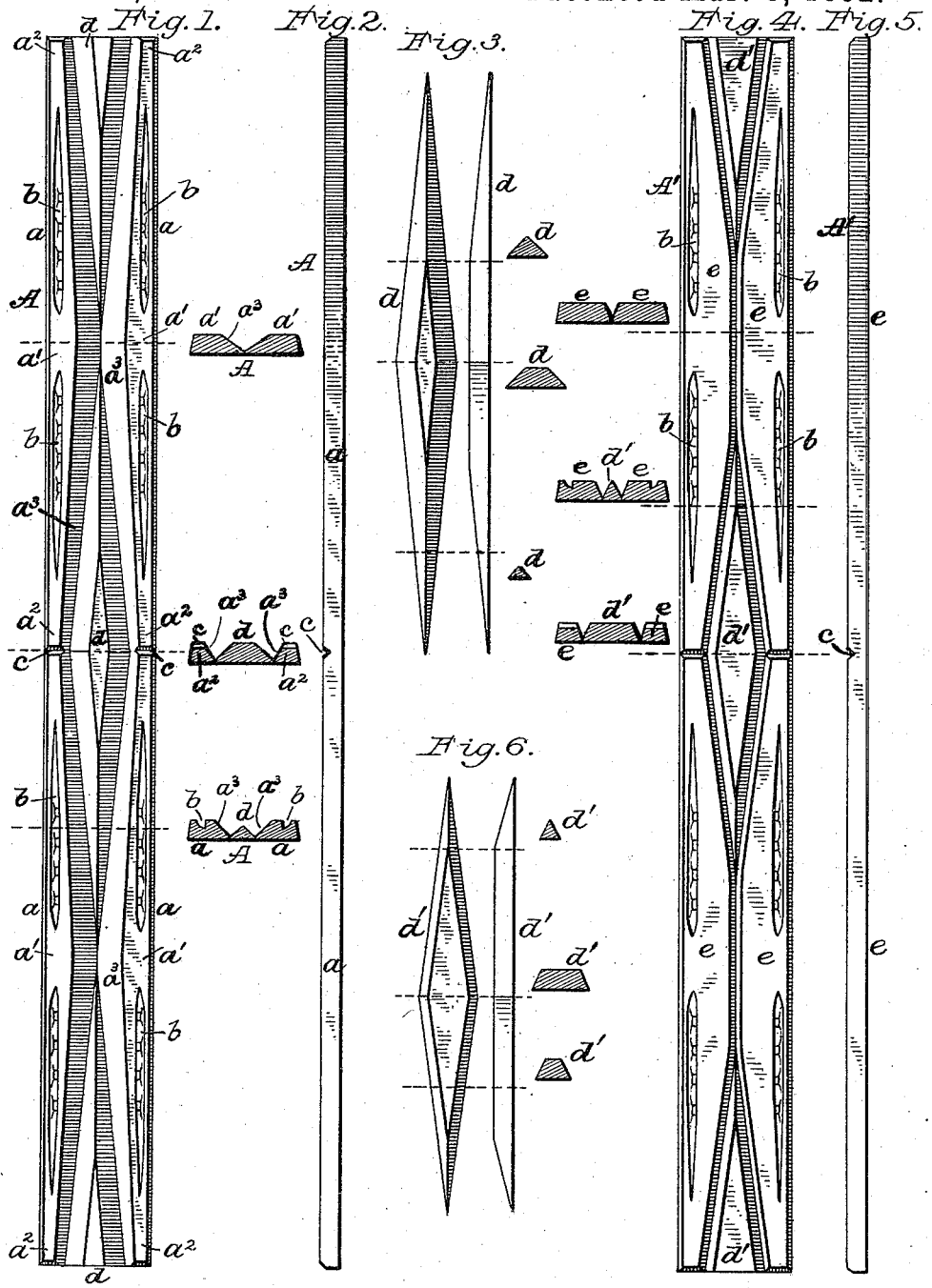
Attest:
Philip F. Larner
Howell Bartle
Inventor:
Charles Henry Perkins
By _____ Attorney

UNITED STATES PATENT OFFICE.

CHARLES HENRY PERKINS, OF PROVIDENCE, RHODE ISLAND, ASSIGNOR TO THE RHODE ISLAND PERKINS HORSE SHOE COMPANY, OF JERSEY CITY, NEW JERSEY.

HORSESHOE-BLANK BAR.

SPECIFICATION forming part of Letters Patent No. 470,352, dated March 8, 1892.

Application filed March 30, 1891. Serial No. 386,991. (No model.)

*To all whom it may concern:*

Be it known that I, CHARLES HENRY PERKINS, of the city and county of Providence, in the State of Rhode Island, have invented certain new and useful Improvements in Horseshoe-Blank Bars; and I do hereby declare that the following specification, taken in connection with the drawings furnished and forming a part of the same, is a clear, true, and complete description of my invention.

I have heretofore devised and disclosed various improvements in horseshoe-blanks and blank-bars restricted to use in the manufacture or production of toe-weighted horseshoes. I have also heretofore devised and disclosed a method and means in the same connection under and by the use of which said toe-weighted horseshoe-blanks are produced with economic facility and with waste metal in the blank-bars restricted to their butts or ends. I now find that toe-weighted blanks may be produced in bars of a novel character in which adjacent to each blank or pair of blanks a waste of metal is involved, and that, notwithstanding the accompanying scrap or waste metal, the production of such bars and their use in the manufacture of toe-weighted shoes involves improvements of substantial value in this art as compared with the hand-working methods in vogue prior to my aforesaid disclosed invention, in that the shoes developed from the blanks of my present blank-bars are speciallay uniform and can be much more economically produced than by hand-working.

A toe-weighted shoe-blank is wide in the middle and quite narrow at its ends, and in my former blank-bars the blanks so alternated in their relative positions that the narrow ends of two abutting blanks were opposite the middle or wide toe portion of a laterally-adjacent blank, thus involving a zigzag parting-line, and a consequent avoidance of waste metal, except at the butts or ends of the bars.

In accordance with my present invention my novel blank-bars contain two rows of blanks in pairs side by side, the blanks being mainly uniform in thickness and the bars having straight and parallel edges, and although each blank is well developed there is between each pair of blanks two pointed waste portions or "scraps" of metal substantially conforming in outline to the adjacent inner edges of the blanks.

To more particularly describe my invention, I will refer to the accompanying drawings, in which—

Figures 1 and 2, in top view, edge view, and in several cross-sections, illustrate one of my novel blank-bars containing blanks which are beveled at their inner edges, as is required in the manufacture of one variety of toe-weighted horseshoes. Fig. 3, in top and edge views and in several sections, illustrates one of the scrap or waste pieces of bar metal. Figs. 4 and 5, in top view, in edge view, and in several lateral sections, illustrate one of my bars containing blanks for plain toe-weighted shoes. Fig. 6, in top and edge views and in several sections, illustrates one of the waste pieces of metal from the bar, Figs. 4 and 5.

The blank-bar A, Figs. 1 and 2, is substantially uniform in thickness and may be of any practicable length, and it contains two rows or lines of blanks $a$, these being in one of their most approved forms. Each blank has a wide central or toe portion $a'$ and narrow end or heel portions $a^2$. The inner edge is beveled, as at $a^3$, the bevel being broad and quite flat at the toe and narrow and steep at the heel portions. Each blank has also nail-scores $b\ b$, usually having head-points, and although these may be formed subsequently to the rolling of the bar they are, with a view to economy, preferably formed during the rolling operation. Between the ends of the blank a well-defined parting-score or gage-mark $c$ is formed, which may or may not extend across the waste or scrap portions $d$. This blank-bar is developed by the use of appropriate rolls, and at the parting-lines between the toe portions of each pair of blanks the metal is nearly separated, and also between the waste portions $d$ and the adjacent inner edges of the blanks. It will be seen that these scrap-pieces $d$ are not only pointed at their ends in conformity with the outlines of the adjacent inner edges of the blanks, but are also tapered on top longitudinally, and also beveled at their edges, thus reducing their bulk and weight as far as may be practicable with metal rolled at ordinary heats. In rolling this bar a comparatively small portion of the displaced metal can be transferred forwardly in the jaws of the rolls; but when the metal is very hot and soft more of the metal can be thus displaced and the weight of the waste portions correspondingly reduced. I prefer, however, to sacrifice some metal in order that the blanks may be more solidly rolled, as when working the metal at ordinary heat.

The blank-bar A', Figs. 4 and 5, differs from the one already described in that each blank $e$ is plain, (or beveled at its inner edge only so far as is necessary for working the parting-lines,) and also in that the blanks at their toe portions $e'$ maintain their width to a greater extent than do the blanks in the bar A, these blanks $e$ being suited for use in the production of heavy shoes for draft-animals, while the beveled blank-shoes are more specially suited for roadsters, although widely used in all lines of service.

The scrap or waste pieces $d'$ in the blank bar A' may obviously be of no greater and even less bulk and weight than the scrap or waste pieces $d$, and in either case the loss incident thereto is quite insignificant in view of the fact that more uniform toe-weighted shoes can be developed from the blanks in either bar than can be produced by hand-smithing, and at much less cost, although not at so low cost as by the use of my hereinbefore-mentioned blank-bars, which involve no waste metal except at their butts or ends.

It will be obvious that the duplication of either of the bars shown, so that the blanks would occupy four lines instead of two lines, will enable the rolling operation to be somewhat cheapened, and in that case the parting-lines between the bars would be merely deep straight scores.

The rolls by which these bars are developed will be made the subject of a separate application for Letters Patent. (See Serial No. 415,654.)

Having thus described my invention, I desire to secure by Letters Patent—

1. A blank-bar containing blanks for toe-weighted horseshoes, in which the blanks are arranged in rows side by side and separated at their inner edges and between their toe and heel portions by pointed waste portions or scrap, substantially as described.

2. A blank-bar containing rows of blanks for toe-weighted horseshoes, each blank being wide in the middle and narrow at its ends and having appropriate nail-scores, and each pair of blanks being side by side and separated at their inner edges for portions of their length by tapered waste metal or scrap, substantially as described.

CHARLES HENRY PERKINS.

Witnesses:
R. W. COMSTOCK,
CHARLES R. STARK.